Aug. 17, 1965   P. M. SWEENEY ETAL   3,201,109
APPARATUS FOR ISOLATING VIBRATIONS
Filed April 16, 1963   5 Sheets-Sheet 1

INVENTORS
LAURENCE L. EBERHART
PATRICK M. SWEENEY
BY
Schmieding and Fultz
ATTORNEYS

THEORETICAL VIBRATION ISOLATION CURVES

INVENTORS
PATRICK M. SWEENEY
LAURENCE L. EBERHART

BY *Schmieding and Fultz*
ATTORNEYS

VIBRATION ISOLATION FOR 1-INCH THICK GLASS FIBER MATERIAL

INVENTORS
PATRICK M. SWEENEY
LAURENCE L. EBERHART

VIBRATION ISOLATION FOR 2-INCH THICK GLASS FIBER MATERIAL

INVENTORS
PATRICK M. SWEENEY
LAURENCE L. EBERHART

United States Patent Office 3,201,109
Patented Aug. 17, 1965

3,201,109
APPARATUS FOR ISOLATING VIBRATIONS
Patrick M. Sweeney and Laurence L. Eberhart, Dublin, Ohio, assignors to Consolidated Kinetics Corporation, Columbus, Ohio, a corporation of Ohio
Filed Apr. 16, 1963, Ser. No. 273,531
1 Claim. (Cl. 267—1)

This invention relates to vibration isolators.

This application is a continuation-in-part of my copending application Serial No. 37,504 filed June 20, 1960, now Patent No. 3,095,187.

In general, the present invention relates to vibration isolation systems that utilize the unique characteristics of pads of glass fiber material provided with a flexible covering. As one aspect of the present invention the glass fiber pads of the type described are provided with air and water impervious coverings and the upper and lower surfaces of the pads are provided with layers of adhesive covered with removeable sheets of backing material. This uniquely adapts the pads to be secured to and maintained in position on a subfloor surface and to be secured to a supported floor structure that is isolated from ambient vibrations by the pads. Moreover, the adhesive coated on the top and bottom surfaces of the pads permit securing the pads together in super-imposed stacked relationship when it is desired to increase the thickness of the glass fiber isolators.

As another aspect of the present invention the flexible covering is impervious to air, sealed within its confines, so that the composite pad operates as a modified damped air spring. When a load is applied to the pad the compressed air confined within the impervious flexible covering supports a portion of the load and the compressed pad of glass fiber material supports a portion of the load applied to the composite pad.

As another aspect of the present invention, the previously described composite pads are utilized in systems that maintain substantially constant natural frequencies under variations in applied loads. It has been discovered, in accordance with the present invention, that the previously described glass fiber pads have force-deflection curves that conform with the following equation $$W = W_0 e^{A(\delta - \delta_0)}$$

When a pad is subjected to a load or force substantially equal to or greater than $W_0$, the natural frequency of the system will remain constant under variations in the imposed force or supported load.

As another aspect of the present invention it has been discovered that glass fiber pads of different densities have different values of $W_0$ above which natural frequencies are maintained substantially constant. Moreover, glass fiber pads of different densities have different natural frequency values, with respect to loading, at which the natural frequency remains substantially constant. Hence, it will be understood that a vibration isolation system can be designed so as to maintain substantially constant natural frequency variations in loading by selecting fiber glass material of the proper density and by subjecting the pad to the proper load or force per unit area.

It is a primary object of the present invention to provide a novel vibration isolator that includes a water and air impervious coating together with layers of adhesive and pull-off backing material on the top and bottom surfaces of the pad which construction permits securing the isolators between substructures and super-structures.

It is another object of the present invention to provide a novel vibration isolator that includes a water and air impervious coating together with layers of adhesive and pull-off backing material on the top and bottom surfaces of the pad which permits securing the pads together in super-imposed stacked relationship.

It is another object of the present invention to provide a novel vibration isolator that functions as a damped air spring modified by the action of a pad of glass fiber material.

It is another object of the present invention to provide a novel vibration isolation system that maintains substantially constant frequencies under variations in the applied force or supported loads.

Further objects and advantages of the present invention will be apparent from the following description, reference being had to the accompanying drawings wherein preferred forms of embodiments of the invention are clearly shown.

Figure 1:
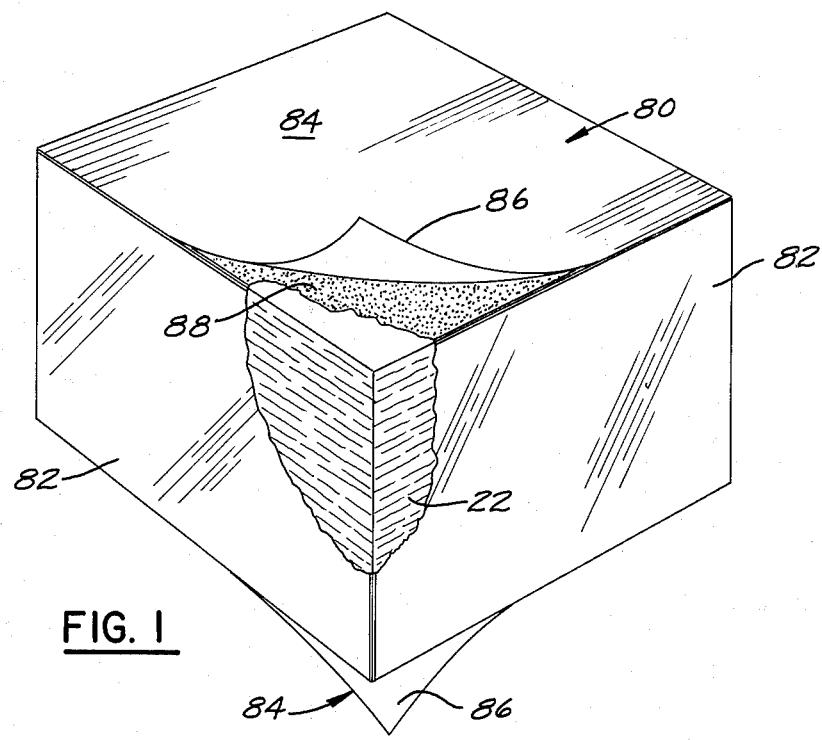
FIG. 1 is a perspective view of a composite vibration isolation pad constructed in accordance with the present invention.
Figure 2:
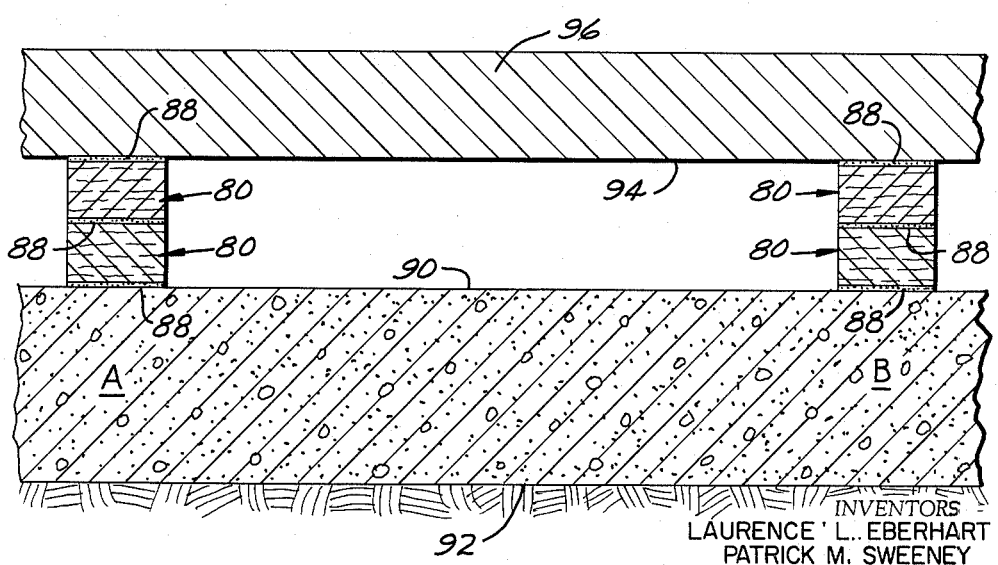
FIG. 2 is a side sectional view of a plurality of the composite isolation pads of FIG. 1 secured together in stacked relationship and fastened between a typical substructure and a superstructure, said structures being secured together and isolated from one another by the pad assemblies.

Reference is next made to FIGS. 1 and 2 which illustrate an isolator pad construction that is particularly useful as an inexpensive means for supporting floors for electronic machinery, pumps, motors, and other machinery in isolated relationship with a concrete slab subfoundation.

One of the isolator pads is indicated generally at 80 and includes a pad of glass fiber material 22, of the type previously described, that is provided with a flexible covering 82 provided on the four sides and top and bottom surfaces.

In the interest of providing a low cost isolator pad 80 the covering preferably comprises a film of polyethylene, polyvinyl chloride, or other similar low cost resinous film material that is impervious to moisture and air.

The resinous covering for isolator pad 80 is preferably applied in sheet form by vacuum applying a sheet to the top and sides and then by next applying another sheet to the bottom surface using a suitable solvent to join the overlapping portions of the sheets to provide a secured envelope that is impervious to moisture and air.

As an alternative where minimum cost is not a factor the impervious coating 82 can be provided by spraying the pad 22 with an elastomer, such as neoprene, dispersed in a suitable solvent.

A pull-off type tape indicated generally at 84 which comprises a sheet of backing material 86, formed of paper or the like, and a layer 88 of mastic is next secured to the top and bottom surfaces of pad 22 such that when the backings 86 are peeled off the unhardened mastic 88 is exposed for attachment to the top surface 90 of a substructure 92 or the under surface 94 of a superstructure 96.

FIG. 2 illustrates a typical assembly that includes a plurality of spaced isolator stations A and B formed by stacking a plurality of isolator pads 80 at each of the stations.

FIG. 2 illustrates in exaggerated perspective the various layers of mastic 88 that secure the isolator pads together and to substructure 92 and superstructure 96.

With a high density glass fiber material defined herein being used for the pads 22 FIG. 1, it has been found that a good standard size for isolators 80 is two inches thick, with a plan view cross sectional area of ten square inches for a pad density of twenty pounds per cubic foot. It will be understood that these densities and dimensions can be varied without departing from the spirit of the invention.

Computer floors and machinery foundations require positive isolation generally in the range between 500 and 800 pounds per cubic foot. In accordance with the formula set forth later herein a loading of 500 requires a center line pad spacing of fifteen inches and a loading of 800 requires a center line pad spacing of twelve inches.

Broadcasting studios, recording studios and other similar applications require relative isolation where the vibrations are to be prevented from entering the supporting floor. These applications generally have a higher floor loading in the 200–500 pounds per cubic foot range, the former requiring a center line pad spacing of 24 inches.

In accordance with the present invention the glass fiber pads 22 must meet certain specifications in order to be uniquely excellent for isolating vibration. The density of the material must be greater than eight pounds per cubic foot, the diameter of the glass fibers must be less than .0005 of an inch, and the length of the glass fibers must be disposed transversely of the direction of load application. For example, fiber diameters between .00020 of an inch and .00024 of an inch gives excellent results in most applications. It has been found that fiber diameters greater than .00060 of an inch result in natural frequencies that are too high for achieving effective vibration isolation and, moreover, pads formed thereof are characterized by inadequate load bearing characteristics. By careful selection of glass fiber diameters, of the air space between the individual fibers, the density, and loading, glass fiber performs like a damped, nonlinear spring due to the elasticity of the glass and the pumping action of the entrapped air. Compressing the glass fiber to heavy densities comparable to balsa wood or soft pine, large loads per unit area can be carried by the glass fiber and the damped nonlinear spring action is retained.

The above described glass fiber pads that include the air spaces between the individual fibers and provide the damping action described, are not impregnated in their inner regions with the elastomers in instances where such are used to form the flexible covering 82. It will therefore be understood that the term "non-impregnated" used in the claim of the present application means that the elastomer covering material is confined to the outer region of the glass fiber pad. It will be understood that the term "non-impregnated" used in the claim does not preclude the possible use of non-bonding lubricants which might be applied to the interior fibers of the pad to minimize abrasion.

It should be pointed out that the previously mentioned air spaces or interstices in the inner regions of the glass fiber pads 22 herein are not impregnated with bonding type elastomers. The glass fibers in the inner regions merely include a thin spray on coating of the previously mentioned suitable resinous binder which bonds the crosswise oriented fibers together only at their intersecting junctions without filling the interstices to provide the previously mentioned air spacings between the individual fibers.

The figure of merit for a vibration isolator is its transmissibility, the ratio of the transmitted vibratory force to the driving or forcing vibratory force, $$\text{transmissibility} = \frac{\text{transmitted force}}{\text{driving force}}$$

In order to make this small, it is necessary that the isolator have a natural or resonant frequency considerably lower than the frequency of the driving force. The resonant frequency is the number of cycles or vibrations per second at which an object on a resilient support will vibrate when it is pushed down and released suddenly. The frequency of the driving force is the number of force alternations per second. Thus, a shaft with a simple unbalance rotating at 1200 r.p.m. has a principle driving frequency of 1200/60 or 20 cycles per second (c.p.s.). Usually, the driving force has components having several frequencies, but these can be considered separately with more attention to the lower frequencies where it is more difficult to isolate vibration.

Figure 3:
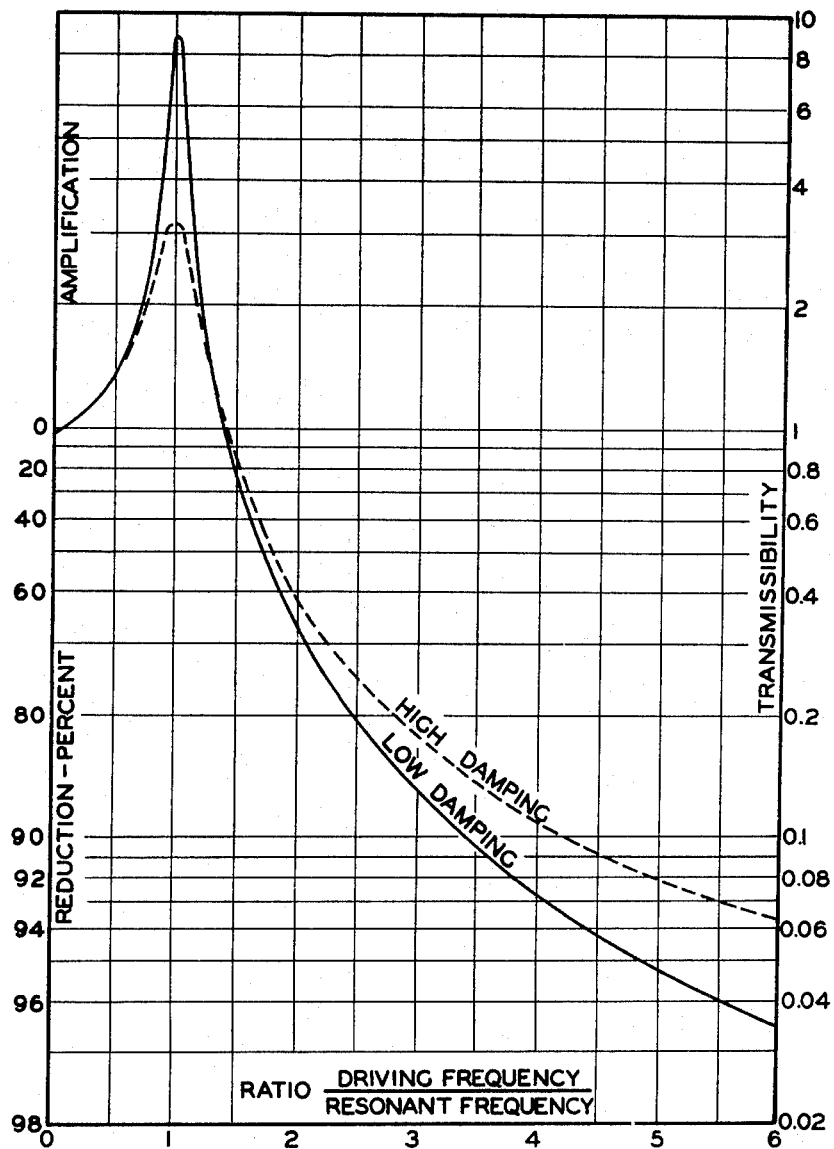
FIG. 3 is a graph illustrating theoretical vibration isolation curves.

The way in which the transmissibility depends on the resonant and driving frequencies is shown in FIG. 3. It is seen that (1) the mounting is effective only for frequency ratios greater than 1.4 (below this, there is amplification of the driving force) and (2) for a given driving frequency, the lower the resonant frequency can be made, the lower the transmissibility will be.

A low resonant frequency is obtained if the stiffness of the isolator is small and the supported weight is large. This combination, however, means a soft support and a large deflection under a static load which may be objectionable because of stability, belt pull, etc. A compromise is often called for and a ratio of frequencies between about 2.5:1 to 4:1 can usually be tolerated. This gives a transmissibility between 0.2 and 0.1, or a reduction of the vibrating force between 80 and 90 percent.

Another factor affecting transmissibility is damping or energy absorption which brings vibrating systems more or less quickly to rest after the driving force has been removed. For example, an automobile has springs to provide a low frequency suspension and has shock absorbers which abstract energy and quickly bring the system to rest after going over a bump. Referring again to FIG. 3, two curves are shown, one for low damping and the other for high damping. Some damping is advantageous near the peak of the curve where the exciting force goes through the resonance region, as in a machine coming up to speed, since this reduces extreme amplitudes, but damping in the operating frequency (speed) region detracts from the vibration isolation effect. This harmful effect is ordinarily not great and, furthermore, the damping is advantageous at higher frequencies involved in noise and shock where the simple theory does not hold.

It is pointed out that no vibration isolation mounting will be as effective as rated if the mounted machinery rests on a resonant or thin support of floor. Thus, machinery on a wooden floor or thin wall will be difficult to isolate.

There are other requirements for a practical vibration isolator aside from its performance in vibration. It must be able to withstand any thrusts necessary for the operation of the machine and must have a long life in spite of mechanical fatigue, corrosion, oxidation, contamination with dirt, oil, moisture, etc. and temperature variations. Glass fiber padding, when not overloaded, is a satisfactory material since it is rather inert chemically and is negligibly affected by the usual contaminants and temperatures.

In designing a vibration isolator, use has often been made in vibration manuals of curves of deflection under the gravity load of the machine plotted against the resonant frequency. The ratio of this frequency to the driving frequency has then been used to find the transmissibility. Except for special cases, including steel helical springs, this procedure gives lower transmissibility than is actually present. Most non-metallic materials such as rubber, plastics, and fibrous materials deflect slowly under load and also recover slowly. This non-linear action results in a dynamic stiffness for vibration which is two to four times the static stiffness under steady load. Information on transmissibility for the above materials must therefore be obtained from measurements under dynamic or vibratory test conditions.

Unlike rubber, the ratio of thickness to free surface is unimportant and a pad of large area will behave the same when it is cut up into a number of small pads of the same thickness.

Figure 4:
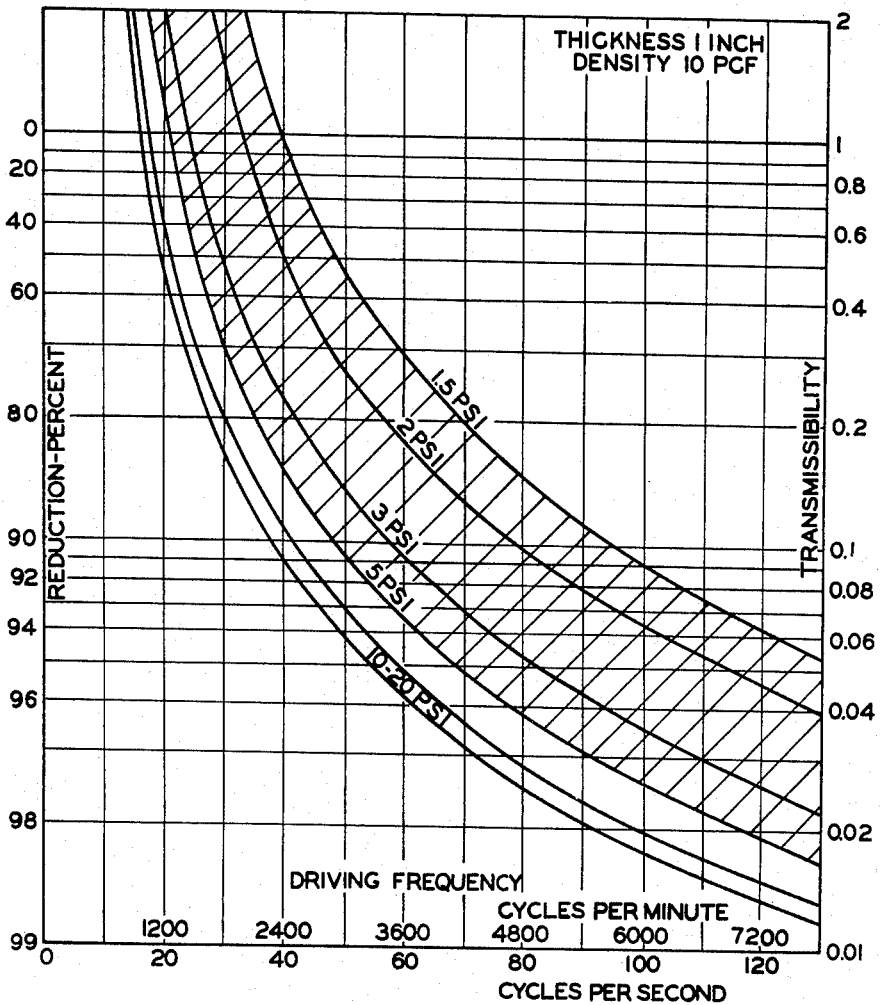
FIG. 4 is a graph showing the vibration isolation characteristics of one-inch thick glass fiber material.

Vibratory tests on glass fiber materials have been made over a considerable range of loads. The results, shown in FIG. 4 are typical for a specific density and can be used as a basis for the design of vibration isolators. Knowing the frequency of the driving force (horizontal scale), the transmissibility or vibration reduction (vertical scale) can be read from the curves for various loads and thicknesses.

For machinery vibration isolations, materials with densities of 10 pounds per cubic foot, or greater, are most practical from a load-bearing standpoint. Design curves are shown for glass fiber to be used as vibration isolation pads. Knowing the frequency of the driving force (horizontal scale), the desired transmissibility (vertical scale) can be found for various loads and thicknesses. One of the advantages of glass fiber material is that its vibration reduction is not as dependent on exact loading as the reduction for many other materials. This is because glass fiber material becomes stiffer as the load is increased and its effective resonant frequency changes less with load than the resonant frequency of many other materials. The charts show design characteristics for thicknesses of 1 and 2 inches. The reduction for other thicknesses can be found by using FIG. 4 for 1-inch and multiplying the actual driving frequency by the square root of the thickness.

Life tests under combined static and vibration loading have shown that glass fiber materials will stand up in general use at static load deflections of about 50 percent.

Figure 5:
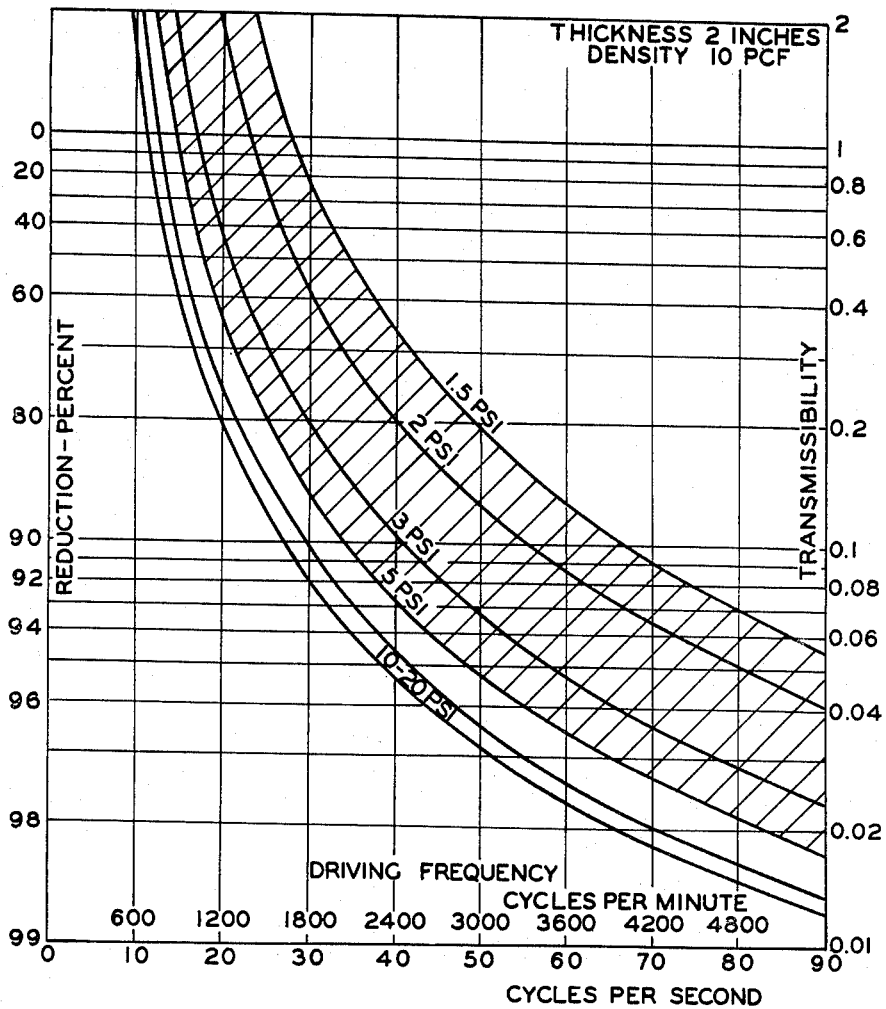
FIG. 5 is a graph showing the vibration isolation characteristics of two-inch thick glass fiber material.

As an example in using the charts, assume that it is desired to reduce the vibration of a machine by 90 percent (to ten percent of the vibration force with no isolation). The machine weighs 100 pounds and has a driving frequency of 30 c.p.s. (a rotational speed of 1800 r.p.m.) with a simple unbalance load. On the design charts, the intersection of a horizontal line at 90 percent reduction with a vertical line at 30 c.p.s. driving frequency gives the static load. In FIG. 4, this point falls below the curves, which means that 90 percent reduction cannot be obtained for thicknesses of 1 inch or less. In FIG. 5, however, the point for 90 percent reduction at 30 c.p.s. falls just above the curves for a static pressure load of 10 to 20 p.s.i. The total area of isolating pads will be the total weight divided by the static pressure load, 50 to 100 square inches, and four pads about 4 x 4 inches should be satisfactory.

In operation, the supporting structure is designed in accordance with the graphs 4 and 5, or similar graphs for various other densities, taking into account that particular load to be supported and driving frequency to be encountered.

In accordance with the present invention it has been discovered that pads of glass fiber material of the type described herein have a unique characteristic that makes them particularly suitable for vibration isolation. This characteristic is the maintenance of constant natural frequency independent of the weight supported by the isolator. The advantage of this useful characteristic is only achieved if the pad of glass fiber material is properly loaded for any given natural frequency and for any given density of the glass fiber isolator.

Figure 6:
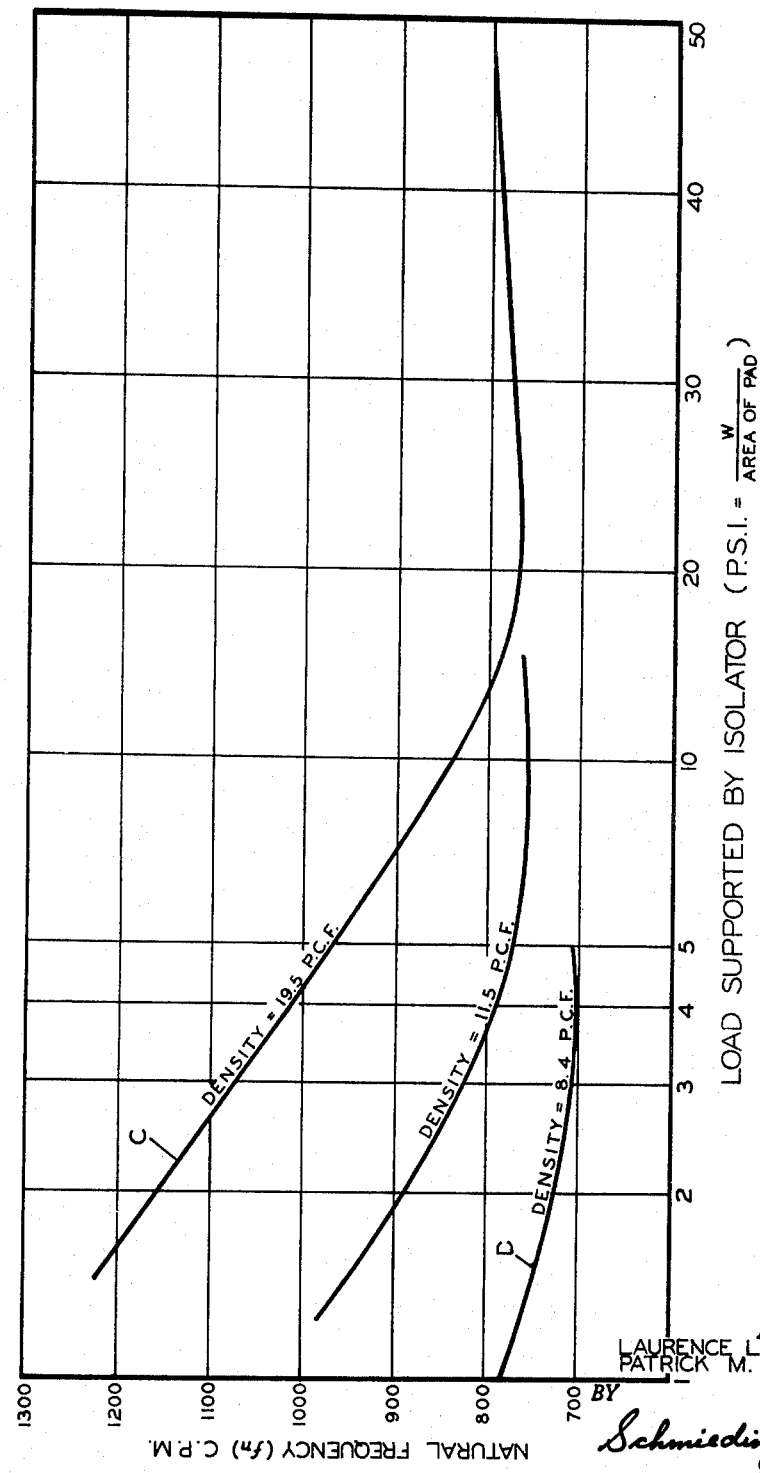
FIG. 6 is a graph showing the relationship between natural frequencies and variations in loads being supported by vibration isolation supports constructed in accordance with the present invention.

FIG. 6 is a graph showing the variations of natural frequency $f_n$ with respect to variations in the load W supported by the isolator for various densities of glass fiber materials ranging between 8.4 and 19.5 pounds per cubic foot.

This unique characteristic of maintaining constant natural frequency can be defined mathematically since the glass fiber pads behave as isolators having a non-linear force deflection curve whose stiffness $k_y$ remains proportional to the weight of the mounted body W at all points on the force-deflection curve. The right side of the below listed equation reduces to a constant, and the natural frequency becomes independent of the weight supported by the isolator.

(1) $$f_n = 3.13\sqrt{\frac{k_y}{W}}$$

Substituting $k_y = dW/d\delta$ in Equation 1 (the force F is equal to the supported weight W) and rearranging terms:

(2) $$\frac{4\pi^2 f_n^2}{9}d\delta = \frac{dW}{W}$$

An expression for the force deflection curve is obtained from the integration of Equation 2. A family of curves results from this process, depending on the constant of integration. A particular curve is specified by selecting a point with the coordinates $W_0$, $\delta_0$ such that all points of the curve whose coordinates are numerically greater than $W_0$, $\delta_0$ will represent conditions of constant natural frequency. Integrating Equation 2:

(3) $$\frac{3\pi^2 f_n^2}{9}\delta\int_{\delta_0}^{\delta} = \log W\int_{W_0}^{W}$$

Equation 3 may be written exponentially as follows:

(4) $$W = W_0 e^{A(\delta - \delta_0)}$$

Equation 2 is obtained from Equation 1 as follows:

Equation 1 $\quad f_n = 3.13\sqrt{\frac{k_y}{W}}$ since $$\frac{\sqrt{g}}{2\pi} = 3.13$$

where $g = 386$ in./sec.$^2$ therefore $$f_n = \frac{1}{2\pi}\sqrt{\frac{k_y g}{W}}$$

let $$k_y = \frac{dW}{d\delta}$$

which is the slope of the load deflection curve. Therefore $$f_n = \frac{2}{2\pi}\sqrt{\frac{\frac{dW}{d\delta}g}{W}}$$

$$f_n^2 = \frac{1}{4\pi^2}\frac{dW}{d}\frac{g}{W}$$

$$\frac{4\pi^2 f_n^2}{g}d\delta = \frac{dW}{W}$$

In going from Equation 1 to Equation 2 the dimensions of $f_n$ have been changed to radians per second. It will, therefore, be understood that "3.13" does not represent $\pi$ in Equation 1 but rather the value set forth above. In view of the above it will be understood why $$\frac{4\pi^2}{g}$$

appears in Equation 2.

An insulator whose force-deflection curve conforms to Equation 4 thus exhibits a constant natural frequency $f_n$ when supporting any load greater than $W_0$.

With reference to FIG. 6, the natural frequency of curve C (19.5 pounds per cubic foot density) remains substantially constant at 780 cycles per minute when the weight of the mounted body W is greater than $W_0$, with $W_0$ being equal to approximately 17 pounds as seen from the abscissa of the graph of FIG. 6 when the weight W of the mounted body is less than $W_0$ (17 pounds), the natural frequency shows the inverse tendency which is characteristic of linear isolators.

With continued reference to FIG. 6 the characteristic of a lower density isolator is illustrated by curve D. Curve D represents a density of the glass fiber material of 8.4 pounds per cubic foot. Here $W_0$ occurs approximately at 3¼ pounds load. Above this loading natural frequency remains substantially constant with variation in load and below this loading the natural frequency shows the inverse tendency which is characteristic of linear isolators.

In the formulas previously discussed herein the following symbols are defined as follows:
$W$=actual load applied to isolator
$W_0$=load above which natural frequency is independent of variations in load W
$\delta$=deflection of isolator under load W
$\delta_0$=deflection of isolator under load $W_0$
$f_n$=natural frequency
$k_y$=stiffness of isolator
$e$=the basis for the Napierian system of logarithms
$g$=gravitational constant
$\pi$=3.1416

$$A = \frac{4\pi^2 f_n^2}{g}$$

While the forms of embodiments of the present invention as herein disclosed constitute preferred forms, it is to be understood that other forms might be adopted, all coming within the scope of the claim which follows.

We claim:

A composite air and glass fiber spring for isolating vibrations comprising, in combination, a plurality of pads disposed in stacked relationship with confronting surfaces joined together by a mastic, each of said pads comprising non-impregnated glass fiber material including a load supporting side, the fibers of said material being crosswise oriented substantially parallel with said load supporting side; and a flexible material covering said pads of glass fiber material, the interior regions of said pads including impregnant free interstices.

References Cited by the Examiner
UNITED STATES PATENTS

| | | | |
|---|---|---|---|
| 2,579,036 | 12/51 | Edelman | 206—46 X |
| 2,689,122 | 9/54 | Musikant | 267—1 |
| 3,029,303 | 4/62 | Severino | 248—205 |
| 3,095,187 | 6/63 | Sweeney et al. | 267—1 |

ARTHUR L. LA POINT, *Primary Examiner.*

PHILIP ARNOLD, *Examiner.*